June 15, 1965   W. R. CROOKS   3,188,808
GAS TURBINE THRUST COMPENSATING DEVICE
Filed Dec. 3, 1962
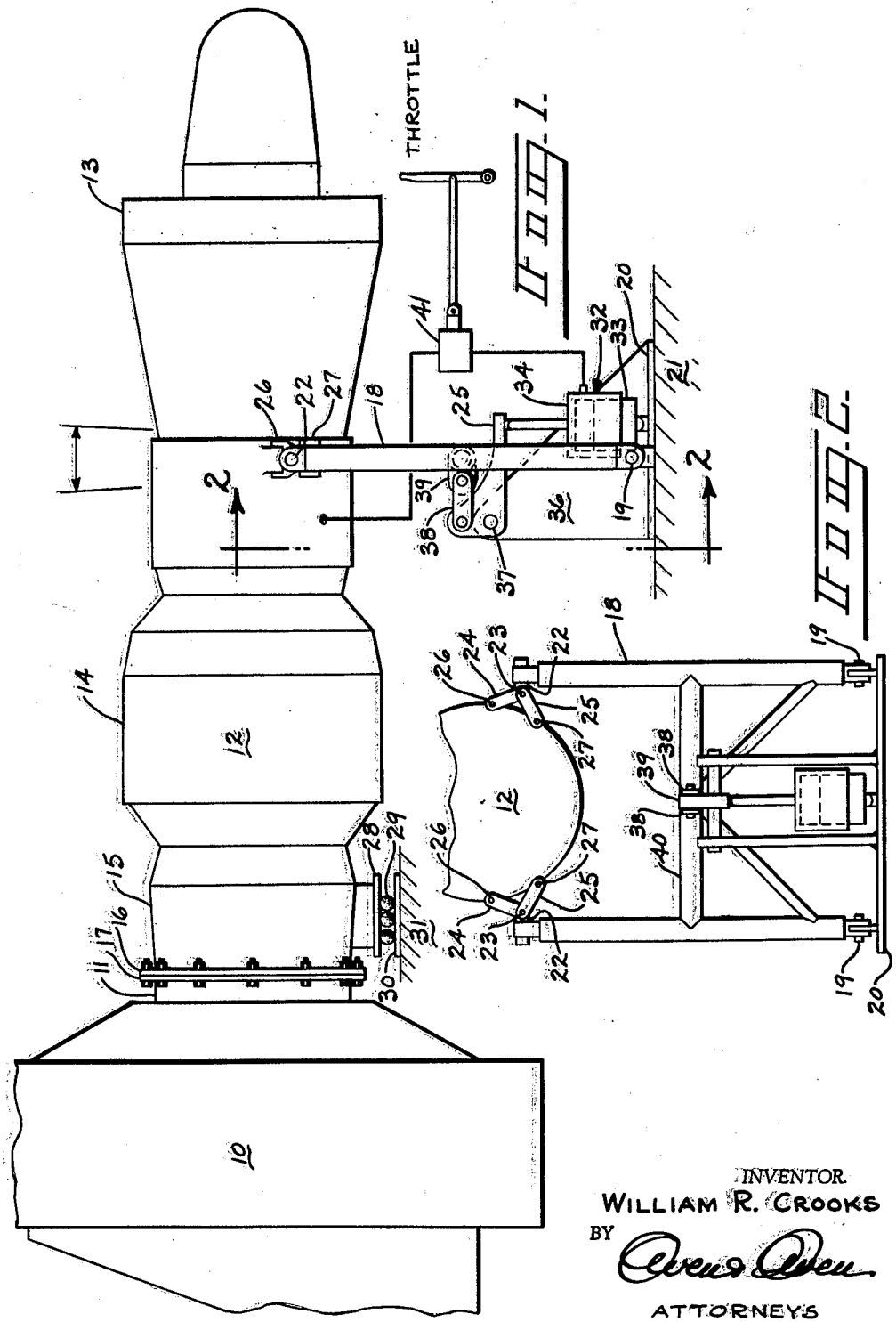
INVENTOR.
WILLIAM R. CROOKS
BY
ATTORNEYS United States Patent Office 3,188,808
Patented June 15, 1965

3,188,808
GAS TURBINE THRUST COMPENSATING DEVICE
William R. Crooks, Mount Vernon, Ohio, assignor to The Cooper-Bessemer Corporation, Mount Vernon, Ohio, a corporation of Ohio
Filed Dec. 3, 1962, Ser. No. 241,838
6 Claims. (Cl. 60—39.16)

The present invention relates to power plants of the type having a turbine driven by a hot gas producer such as a jet engine; and more particularly to means for connecting and supporting the hot gas producer relative to the turbine to overcome thermal expansion problems.

In one type of power plant which has been utilized heretofore, the thrust that is produced by the discharged hot gases of a jet engine is directed into a stationary turbine to produce mechanical power. Jet engine structures are such that they must receive their major support adjacent their compressor section which is at the end of the engine remote from the nozzle through which the hot gases are discharged. In the prior art installations with which I am familiar, the jet engines have been supported by a fixed support at the location near the compressor section, and the growth of the engine due to thermal expansion has been in the direction of the stationary turbine. A gas tight seal must be provided between the nozzle of the jet engine and the turbine, and the prior art has used a bellows type expansion joint to provide a seal which will accommodate the thermal expansion of the jet engine. These bellows are subjected to serve temperature, corrosion, and vibration conditions, and the life of these bellows has proved to be quite short, and in some instances a complete rupture of the bellows has occurred.

An object of the present invention is the provision of a new and improved method of supporting and connecting a jet engine relative to a stationary turbine whereby the bellows type of connection may be eliminated.

A further object of the invention is the provision of a new and improved method of supporting and connecting a jet engine relative to a stationary turbine wherein the jet engine is fastened directly to the turbine with a rigid type of seal structure, and the jet engine is supported at a point remote from this structure by means of a movable thrust absorbing support which is suitably biased in such a direction and with such force as to generally offset the forces tending to separate the jet engine and the stationary turbine, but which will allow for thermal expansion.

The invention resides in certain constructions, and combinations, and arrangements of parts, and further objects and advantages of the present invention will become apparent to those skilled in the art to which it relates, from the following description of a preferred embodiment described with reference to the accompanying drawing forming a part of this specification, and in which:

FIG. 1 is a side elevational view of a power plant comprising a stationary turbine and an axially extending jet engine which is connected to the turbine and supported according to the present invention; and FIG. 2 is a cross sectional view taken approximately on the line 2—2 of FIG. 1.

The power plant shown in the drawing generally comprises a power turbine 10 having a horizontal axis about which it rotates and which is suitably fixed to a foundation (not shown). The turbine 10 is provided with an axially extending inlet 11 through which it receives the exhaust from a hot gas producer, which in the present instance is a gas turbine or jet engine 12. The gas turbine engine 12 comprises a compressor section 13 which compresses air entering from its right hand side as seen in FIG. 1, and passes it on to a burner section 14 in which fuel is mixed and burned with some of the compressed air. The resulting products of combustion are mixed with the balance of the compressed air from the compressor 13, following which the hot gas mixture passes through the nozzle 15 of the gas turbine engine into the inlet 11 of the turbine 10.

According to the present invention, the nozzle 15 of the engine is connected rigidly to the inlet connection 11 of the turbine in a manner which will not absorb the dimensional change caused by thermal expansion. In the embodiment shown in the drawing, the nozzle 15 and the inlet connection 11 are flanged and the two are bolted together with a suitable gasket material therebetween.

The air which is compressed in the gas turbine engine may be heated up to several hundred degrees Fahrenheit as it passes through the compressor section, so that a considerable dimensional growth due to thermal expansion takes place in the compressor section 13 when the engine is placed in operation. In addition, considerably higher temperatures are produced in the burner section 14, so that even a greater thermal expansion takes place in this section of the gas turbine engine when the engine is placed in operation. The magnitude of the change in dimensions due to thermal expansion that is involved over the axial length of at least one type of engine has been found to be in excess of one inch.

As previously stated, the construction of gas turbine engines of the jet engine type is such that the major support for the engine must be had in the region of the compressor section 13, and it is in this region that the engine must be supported in a manner to absorb the thrust produced by the hot gases issuing from its nozzle 15. According to the present invention, the engine 12 is supported by means of an H frame 18, the bottom end of which is suitably pivoted as by the bolts 19 to a base plate 20 which is suitably fastened to the foundation 21. The upper end of the H frame 18 is also pivoted to the jet engine 12, so that the H frame supports the weight of the engine while allowing the engine to expand away from the turbine 10.

The pivotal connection to the engine comprises a pair of knuckle pins 22 which extend laterally through the top of respective sides of the H frame 18 and are suitably secured in place. The inner ends of the knuckle pins carry a lateral bolt 23 which, in turn, pivotally connect the adjacent ends of a pair of links 24 and 25 to the knuckle pins 22. The outer ends of the links 24 and 25 are spread apart and suitably bolted to the engine as at 26 and 27 in such manner as to be capable of opposing the longitudinal thrust of the engine while at the same time being capable of accommodating the radial thermal expansion of the engine. In order to relieve the flange connections 16 and 17 of lateral loads, any suitable connection can be utilized which will support the nozzle section 15 laterally but will permit such slight axial movement as is necessary due to thermal expansion. In the embodiment shown in the drawing, this is accomplished by a horizontal plate 28 that is suitably affixed to the frame of the engine, and a plurality of rollers 29 that are positioned between the horizontal plate 28 and a bed plate 30 which rests upon a suitable foundation 31. The supporting structure so far described will adequately support the weight of the engine 12 at spaced apart points and will allow for thermal expansion, but will not absorb the thrust which is produced by the hot gases issuing from the engine.

According to the present invention, the axial force which would be placed upon the connection between the engine 12 and the power turbine 10 by the thrust of the engine is compensated for by an equal and opposite endwise force that is placed upon the H frame 18. In some instances this biasing force which is placed upon the engine to overcome its axial forces could be a suitable spring arrangement, but in the preferred embodiment of the invention is a force that is produced by a fluid pressure motor, and preferably a pneumatically actuated motor, so that there will be very little "spring rate" effect produced to oppose the growth of the engine due to thermal expansion. In the embodiment shown in the drawing, the compensating force for the axial forces of the jet engine is produced by an air cylinder 32 having a piston 33 that is suitably pivotally connected to the base plate 20. The housing forming the cylinder chamber 34 is, in turn, pivotally connected to the long leg of the bell crank 35, which bell crank 35 has its center point pivoted to a fixed bracket 36 as by a pin 37. The short leg of the bell crank is pinned to a pair of drag links 38, the other ends of which is pivotally connected to a bracket 39, welded or otherwise fixed to the cross bar 40 of the H frame 18. The supply of air pressure to the air cylinder 32 causes the bell crank to rotate about the pin 37 to thereby pull the drag links 38 and H frame 18 forwardly in the direction of the fixed turbine 10 to oppose the axial thrust of the jet engine 12. The air pressure that is supplied to the air cylinder 32 is controlled in any convenient manner, so that its pressure will produce a force on the engine 12 which is equal and opposite to the thrust of the engine. In the embodiment shown in the drawing, air pressure for the air cylinder 32 is obtained from the engine compressor section 13, and the volume of air and its pressure which is supplied the air cylinder is regulated by a control valve 41. In some instances the control valve 41 may be regulated by the engine fuel control to provide an air pressure to the air cylinder 32 whose thrust just equals that of the engine. In the stationary installations with which the present invention is primarily concerned, however, no elaborate control is needed and the control valve 41 may be regulated in accordance with the power setting of the engines throttle lever.

While the present invention has been described as providing a support structure which is biased in a direction to oppose the thrust of the gas producing engine, it may be desirable in some instances to provide a first constant force to oppose the thrust of the engine and to provide a second variable force in the direction of the thrust to oppose the first biasing force. This can be accomplished, for example, by mounting the gas producing engine vertically, so that its weight opposes the thrust of the engine at all times. With this arrangement, a second force is added to the support of the engine in the direction of its thrust. The intensity of the second force, with this arrangement, may be controlled so that its effect when added to the thrust of the engine, just equals the weight of the engine.

While the invention has been described in considerable detail, I do not wish to be limited to the particular embodiment shown and described, and it is my intention to cover hereby all novel adaptations, modifications, and arrangements thereof which come within the practice of those skilled in the art to which the invention relates.

What I claim is:

1. In a power plant having a hot gas producer comprising a compressor and turbine connected by a driving shaft, said hot gas producer discharging gases in a predetermined direction to produce thrust in an opposite direction, and a power turbine having a shaft separate from the shaft of said hot gas producer and which is fixed in the path of said discharge gases for providing external shaft work: a substantially gas tight connection between said gas producer and power turbine, support means for said gas producer which accommodates movement of said hot gas producer in said predetermined and opposite directions, and means to establish a sustained force on said gas producer in a direction to oppose said thrust that exists during operation in an amount to remove substantially all force from said connection between said gas producer and power turbine during normal operation.

2. In a power plant having a hot gas producer comprising a compressor and turbine connected by a driving shaft, said hot gas producer discharging gases in a predetermined direction to produce thrust in an opposite direction, and a power turbine having a shaft separate from the shaft of said hot gas producer and which is fixed in the path of said discharge gases for providing external shaft work: a substantially gas tight connection between said gas producer and power turbine, support means for said gas producer which accommodates movement of said gas producer in said predetermined and opposite directions, at least one expansible chamber operatively connected to said gas producer to establish a sustained force on said gas producer in one of said directions when pressure is applied thereto, and means regulating pressure in said expansible chamber in such manner as to compensate for changes in thrust during operation to substantially reduce the forces on said connection between said gas producer and said power turbine.

3. In a power plant having a hot gas producer comprising a compressor and turbine connected by a driving shaft, said hot gas producer discharging gases in a predetermined direction to produce thrust in an opposite direction, and a power turbine having a shaft separate from the shaft of said hot gas producer and which is fixed in the path of said discharge gases for providing external shaft work: a substantially gas tight connection between said gas producer and power turbine, support means for said gas producer which accommodates movement of said gas producer in said predetermined and opposite directions, at least one expansible chamber operatively connected to said gas producer to establish a sustained force on said gas producer in said predetermined direction when pressure is applied thereto and means modulating a supply of pressure fluid to said expansible chamber to provide a pressure intensity that substantially offsets changes in thrust on said gas producer at all times to substantially reduce the forces on said connection between said gas producer and said power turbine.

4. In a power plant having a gas turbine engine having a compressor section, a burner section, and a turbine connected to said compressor by a driving shaft, said turbine having a discharge from which gases flow in a predetermined direction to produce thrust in an opposite direction, and a power turbine having a shaft separate from said shaft of said gas turbine engine and fixed in the path of said discharge gases for producing shaft work: a substantially gas tight connection between said gas turbine engine and power turbine, support means for said gas turbine engine which accommodates movement of said gas turbine engine in said predetermined and opposite directions, at least one expansible chamber operatively connected to said gas turbine engine to establish a sustained force on said gas turbine engine in one of said predetermined directions when pressure is applied thereto, and means communicating pressure fluid from said compressor section of said jet engine to said expansible chamber to provide a pressure intensity that substantially compensates for changes in thrust on said gas turbine engine at all times to substantially reduce the forces on said connection between said gas turbine engine and said power turbine.

5. In a power plant having a gas turbine engine having a compressor section, a burner section, and a turbine having a shaft connected to and driving said compressor and from which gases discharge in a horizontal direction through an axially extending discharge, and a power turbine having a shaft separate from said shaft of said gas turbine engine and fixed in the path of said discharge gases for producing shaft work: a substantially gas tight connection between said gas turbine engine and said power turbine, a vertical support for said gas turbine engine, the lower end of said vertical support being adapted to be pivotally supported, and the top end of said support being pivotally attached to said gas turbine engine, and a fluid pressure motor which when pressurized exerts a force on said vertical support to establish a sustained force on said gas turbine engine toward said power turbine, having an intensity substantially equaling the thrust of said gas turbine engine.

6. In a power plant having a gas turbine engine having a compressor section, a burner section, and a turbine driving said compressor and from which gases discharge in a horizontal direction through an axially extending discharge, and a power turbine having a shaft separate from said shaft of said gas turbine engine and fixed in the path of said discharge gases for producing shaft work: a substantially gas tight connection between said gas power turbine engine and said turbine, a vertical support for said gas turbine engine, the lower end of said vertical support being adapted to be pivotally supported, and the top end of said support being pivotally attached to said gas turbine engine, a fixed anchor, a crank arm, means pivotally connecting said crank arm to said fixed anchor, a fluid pressure motor which when pressurized exerts a sustained biasing force on said crank arm in one direction, means transferring said biasing force from said crank arm to said vertical support in a direction biasing said gas turbine engine towards said power turbine in response to increase in pressure in said fluid pressure motor, and means regulating the pressure in said fluid pressure motor in a manner causing the force exerted on said gas turbine engine by said vertical support to substantially equal the thrust of said gas turbine engine.

References Cited by the Examiner
UNITED STATES PATENTS

| 2,380,274 | 7/45 | Trott | 248—5 |
| 2,650,050 | 8/53 | Chandler | 248—5 |
| 2,650,753 | 9/53 | Howard | 60—39.32 |
| 2,661,593 | 12/53 | Hughes | 60—39.31 |
| 2,789,417 | 4/57 | Kuzmitz | 60—39.28 |
| 2,926,525 | 3/60 | Kroeger | 73—116 |

SAMUEL LEVINE, *Primary Examiner.*